(12) United States Patent
Martin

(10) Patent No.: US 7,800,646 B2
(45) Date of Patent: Sep. 21, 2010

(54) SPORTING EVENT IMAGE CAPTURE, PROCESSING AND PUBLICATION

(75) Inventor: Francisco J. Martin, Corvallis, OR (US)

(73) Assignee: Strands, Inc., Corvallis, OR (US)

(*) Notice: Subject to any disclaimer, the term of this patent is extended or adjusted under 35 U.S.C. 154(b) by 0 days.

(21) Appl. No.: 12/763,420

(22) Filed: Apr. 20, 2010

(65) Prior Publication Data

US 2010/0191827 A1 Jul. 29, 2010

Related U.S. Application Data

(62) Division of application No. 12/646,868, filed on Dec. 23, 2009.

(60) Provisional application No. 61/140,810, filed on Dec. 24, 2008.

(51) Int. Cl.
*H04N 7/18* (2006.01)
(52) U.S. Cl. .................................. 348/157; 348/143
(58) Field of Classification Search ............... 348/143, 348/157
See application file for complete search history.

(56) References Cited

U.S. PATENT DOCUMENTS

| | | | |
|---|---|---|---|
| 5,600,368 A * | 2/1997 | Matthews, III | 348/143 |
| 6,353,390 B1 | 3/2002 | Beri | |
| 6,545,705 B1 | 4/2003 | Sigel | |
| 6,608,563 B2 | 8/2003 | Weston | |
| 6,985,875 B1 | 1/2006 | Wolf | |
| 7,047,214 B2 | 5/2006 | Wolf | |
| 7,155,739 B2 | 12/2006 | Bari et al. | |

(Continued)

FOREIGN PATENT DOCUMENTS

JP 2002-281492 A1 9/2002

(Continued)

OTHER PUBLICATIONS

An event model and its implementation for multimedia information representation and retrieval; D. Pack, R. Singh, S. Brennan, R. Jain; School of Electric. & Comput Eng., Georgia Inst. Of Technol., Atlanta, GA.; Multimedia and Expo, 2004. ICME '04. 2004 IEEE International Conference; Publication Date: Jun. 27-30, 2004; pp. 1611-1614; vol. 3.

(Continued)

*Primary Examiner*—Allen Wong
(74) *Attorney, Agent, or Firm*—Stolowitz Ford Cowger LLP

(57) ABSTRACT

Systems, methods and software are disclosed for capturing and/or importing and processing media items such as digital images or video (202) associated with a sporting event such as a marathon or bicycle race (FIG. 3). The media items are processed, including bib number or facial recognition if necessary (204, 206, 504), to associate them with an individual participant. Other input sources may include spectator uploads (506), external web sites and media sharing (508) or social networking (510) services. The system (500) aggregates, organizes and generates content, and distributes it (580) via various output channels, which may include event web sites (256), personal feeds (250), and other output channels (260, 254, 252, FIG. 4). Preferably, selected content is associated with at least one individual participant in the event, and that content is automatically distributed to channels that are associated with that individual participant.

8 Claims, 5 Drawing Sheets

U.S. PATENT DOCUMENTS

| | | | |
|---|---|---|---|
| 7,158,689 | B2 | 1/2007 | Valleriano |
| 7,254,516 | B2 | 8/2007 | Case, Jr. |
| 7,301,569 | B2 | 11/2007 | Kinjo |
| 7,305,182 | B1 | 12/2007 | Rhyne |
| 7,340,765 | B2 | 3/2008 | Feldmeier |
| 7,403,224 | B2 | 7/2008 | Fuller |
| 7,430,003 | B2 | 9/2008 | Nichols |
| 7,512,407 | B2 | 3/2009 | Wu et al. |
| 7,519,200 | B2 | 4/2009 | Gokturk |
| 7,587,068 | B1 | 9/2009 | Steinberg |
| 7,594,264 | B2 | 9/2009 | Meyers et al. |
| 2002/0090217 | A1 | 7/2002 | Limor |
| 2002/0092019 | A1 | 7/2002 | Marcus |
| 2003/0210808 | A1 | 11/2003 | Chen |
| 2004/0135902 | A1 | 7/2004 | Steensma |
| 2004/0201683 | A1 | 10/2004 | Murashita |
| 2004/0201738 | A1 | 10/2004 | Moores, Jr. |
| 2005/0037872 | A1 | 2/2005 | Fredlund |
| 2006/0064731 | A1 | 3/2006 | Kahle |
| 2006/0125930 | A1 | 6/2006 | Mindrum |
| 2006/0235765 | A1 | 10/2006 | David |
| 2006/0280427 | A1 | 12/2006 | Snowdon |
| 2006/0287930 | A1 | 12/2006 | Wolf |
| 2007/0022438 | A1 | 1/2007 | Arseneau |
| 2007/0035612 | A1 | 2/2007 | Korneluk |
| 2007/0118239 | A1 | 5/2007 | Zimmermann |
| 2007/0291323 | A1 | 12/2007 | Roncal |
| 2008/0028294 | A1 | 1/2008 | Sell |
| 2008/0052349 | A1 | 2/2008 | Lin |
| 2008/0274798 | A1 | 11/2008 | Walker |
| 2009/0009605 | A1 | 1/2009 | Ortiz |
| 2009/0060321 | A1 | 3/2009 | Gillard |
| 2009/0063419 | A1 | 3/2009 | Nurminen |
| 2009/0141138 | A1 | 6/2009 | DeAngelis |
| 2009/0185723 | A1 | 7/2009 | Kurtz |
| 2009/0270166 | A1 | 10/2009 | Thukral |

FOREIGN PATENT DOCUMENTS

| | | |
|---|---|---|
| JP | 2003-209786 A | 7/2003 |
| JP | 2005-346355 A | 12/2005 |
| JP | 2006-174124 A1 | 6/2006 |
| WO | WO 99/19811 A2 | 4/1999 |
| WO | WO 00/04711 A1 | 1/2000 |
| WO | WO 2006/099688 A1 | 9/2006 |

OTHER PUBLICATIONS

HP Technology Keeps Pace for 2004 Boston Marathon; Business Wire; New York, Apr. 6, 2004; p. 1.

PhotoCrazy; http://www.photocrazy.com; 1999.

Pixel Magic Imaging Chosen by seemesmile.com as Online Digital Photography Fulfillment Service Provider; Sep. 5, 2000.

Racepix365; http://www.boards.ie/vbulletin/showthread.php?t=2055405437; Oct. 24, 2008; Source of website: http://www.racepix365.com/works.aspx?id=13.

Technology Employed by 2008 Amgen Tour of California Brings Enhanced Live Race Action to Fans Around the World; Feb. 15, 2008.

Global Patent Solutions Search Report dated Dec. 10, 2009; Research Director: Kathryn Odland.

Dynamic context capture and sistributed video arrays for intelligent spaces; M.M. Trivedi, K.S. Huang, I. Mikic; Comput. Vision & Robotics Res. Lab., Univ. of California, San Diego, CA; IEEE Transactions on Systems, Man & Cyvernetics, Part A (Systemsn & Humans) vol. 35 No. 1 p. 145-163; Jan. 2005.

A sports video browsing and retrieval system based on multimodal analysis: Sports BR; Hua-Yong Liu and Hui Zhang; Dept. of Comput. Sci., Central China Normal Univ., Wuhan, China. This paper appears in: Machine Learning and Cybernetics, 2005. Proceedings of 2005 International Conference on Publication Date: Aug. 18-21, 2005. vol. 8; pp. 5077-5081. Location: Guangzhou, China; ISBN: 0-7803-9091-1; INSPEC Accession No. 8705088: Digital Object Identifer: 10.1109/ICMLC.2005.1527838; Current Version Published: Dec. 7, 2005.

Automatic detection of player positions and trajectories during a soccer match for the measurement of physical and tactical performance; T. Battikh, I. Jabri, M. Annabi. This paper appears in: Electrical and Computer Engineering, Canadian Journal of; Published Jun. 6, 2007; vol. 32 Issue 2; pp. 113-119.

Utilizing Metadata Contained in Digital Images Files; Sep. 13, 2007; disclosed by IBM.

Panoramio-Photos of the World, www.panoramio.com, http://web.archive.org/web/2008070101023330/http://www. panoramio.com/, Jul. 1, 2008.

OAuth Core Specification 1.0; http://oauth.net/core/1.0/;dated Dec. 4, 2007.

Introducting OAuth 2.0; http://hueniverse.com/2010/05/introducing-oath-2-0/; by Eran Hammer-Lahay; dated May 15, 2010.

Panormio-Photos of the Week, www.panoramio.com, http://web.archive.org/web/200807010102330/http://www.panoramio.com/; Jul. 1, 2008.

* cited by examiner

SPORTING EVENT IMAGE CAPTURE, PROCESSING AND PUBLICATION

RELATED APPLICATIONS

This application is a divisional of pending U.S. application Ser. No. 12/646,868 filed Dec. 23, 2009, which in turn claims priority to U.S. Provisional Application No. 61/140,810 filed Dec. 24, 2008 and incorporated herein by this reference.

COPYRIGHT NOTICE

© 2008-2010 Strands, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for on-line collection, aggregation, analysis and distribution of media items such as images and video associated with sporting events and with individual participants in such events.

BACKGROUND OF THE INVENTION

The present invention pertains to athletic or sporting events, especially those that involve individuals or small groups of participants—for example a cross-country or marathon runner for illustration. Each runner in this example has an identifier that distinguishes her from the other runners in the same event. Traditionally, this identifier comprises a "bib number," meaning a number (usually an integer, but it may be alpha-numeric or any other defined symbol) that is printed on a placard that in turn can be pinned, clipped or otherwise attached to the runner's clothing so that the bib number is visible to an observer during the sporting event. Such a placard is usually made of a flexible but preferably durable, waterproof, material. It may be suspended, for example around the user's neck or arm, rather than attached to the clothing. Alternatively, or in addition, the bib number may be attached to the participant's bicycle, boat, motorcycle, or other equipment.

It is known to provide sporting event photographs after the event for inspection, selection and distribution via a computer network. Typically photographs are taken, and bib numbers are recognized by human visual inspection. Those numbers can be associated with a roster (or database) of participants in the event. The photographs (actually digital files containing the photographic content) are transferred to a computer network server, and access to the server enables the participants or others to browse the photos, order prints, etc.

According to U.S. Pat. No. 6,985,875 the identifying data can include a name of an event participant, a number corresponding to a number worn by the event participant, the date and time the photograph was taken, or a code captured from a component as it passes a sensor. Such a component can be passive or active and can include a bar code, inductive device, RFID tag or an electronic transmitting device which is worn by the event participant. The event participants may be informed of the identifying data by posting the identifying data associated with each photograph so that it is made available to the participants of the event (or friends and family) for later use in searching the server. The photographs are cataloged in the server according to the identifying data and can be subsequently ordered using the server which is typically an Internet web-site.

The prior art is lacking in several respects. For example, recognizing bib numbers by human observation is time consuming and expensive. Imagine the effort to sort out thousands of images of thousands of runners in the New York Marathon. Another difficulty is that even if pictures are matched to a participant, the location where the picture was taken is often unknown, unless a person who took the picture records and provides the location data, or an observer of the picture happens to recognize the location in the picture. A user of a social networking web site, for example Facebook®, can manually upload and "tag" a photo with descriptive information, but this process is cumbersome and may not be reliable. In general, random photos of an event may be interesting, especially to the participants, and perhaps her family members or teammates, but their utility is limited without associating reliable time, location and route information. The present invention, in various embodiments, seeks to provide novel products and services by combining inputs from various data sources, and processing the inputs in new ways.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one embodiment, a computer-implemented method calls for receiving digital image input files, still or video, from at least one input source, and storing the input files in memory. Preferably, each input file includes a digital image showing at least one person who is participating in a selected sporting event at the time the image was captured. The method includes processing an uploaded image so as to machine-recognize a bib number worn by a person in the image, or the respective bib numbers worn by several people. By accessing a database of participants in the sporting event, and or an event database, a server can automatically associate the image with one or more individual participant(s) by matching the machine-recognized bib number(s) to record(s) in the database. This feature contrasts with prior art, e.g. social networking sites, where photographs or other media must be manually associated with a user or other persons. In another embodiment, the location and time associated with a photo may be used to search a database of events to identify the corresponding event.

The method further calls for accessing data defining a route of the sporting event; and determining a location along the route where the image of the participant was captured. Then the system generates output including, in an embodiment, at least one photo and/or video that includes an image of the associated individual and wherein the output content includes an indication of a location along the route where the photo or video was captured. For example, a route map may be displayed, with the photo of the participant superimposed on the route map, with a pointer to the location where the photo was taken.

In a preferred embodiment, the method further includes electronically distributing the digital output content to at least one of an event web site, the associated participant's personal space at a social networking site, and via the user's personal feed.

In another aspect, an embodiment of the invention aggregates media items (text, photos, video, etc.) from a wide variety of sources to paint a more engaging, robust and socially interactive collage of an event, such as a marathon. For example, photos or other media from friends, spectators, other web sites, even participants themselves are assembled at a common site for archiving and or distribution to the public. The various input items can be historic (pre-existing before an event), real-time (generated during the event), or uploaded and added to the site after the fact.

On the distribution side, content including data, media items, etc. may be distributed into a variety of existing Web 2.0 applications. Unlike conventional broadcast media such as television, the content provided by the present system is no longer limited to a few highlights of an event, or clips of a few famous athletes in action. Rather, many or even every individual participant in an event can be identified, and their individual information (photos, scores, results, video clips, etc.) can be distributed to all who are interested, in an interactive and compelling manner.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
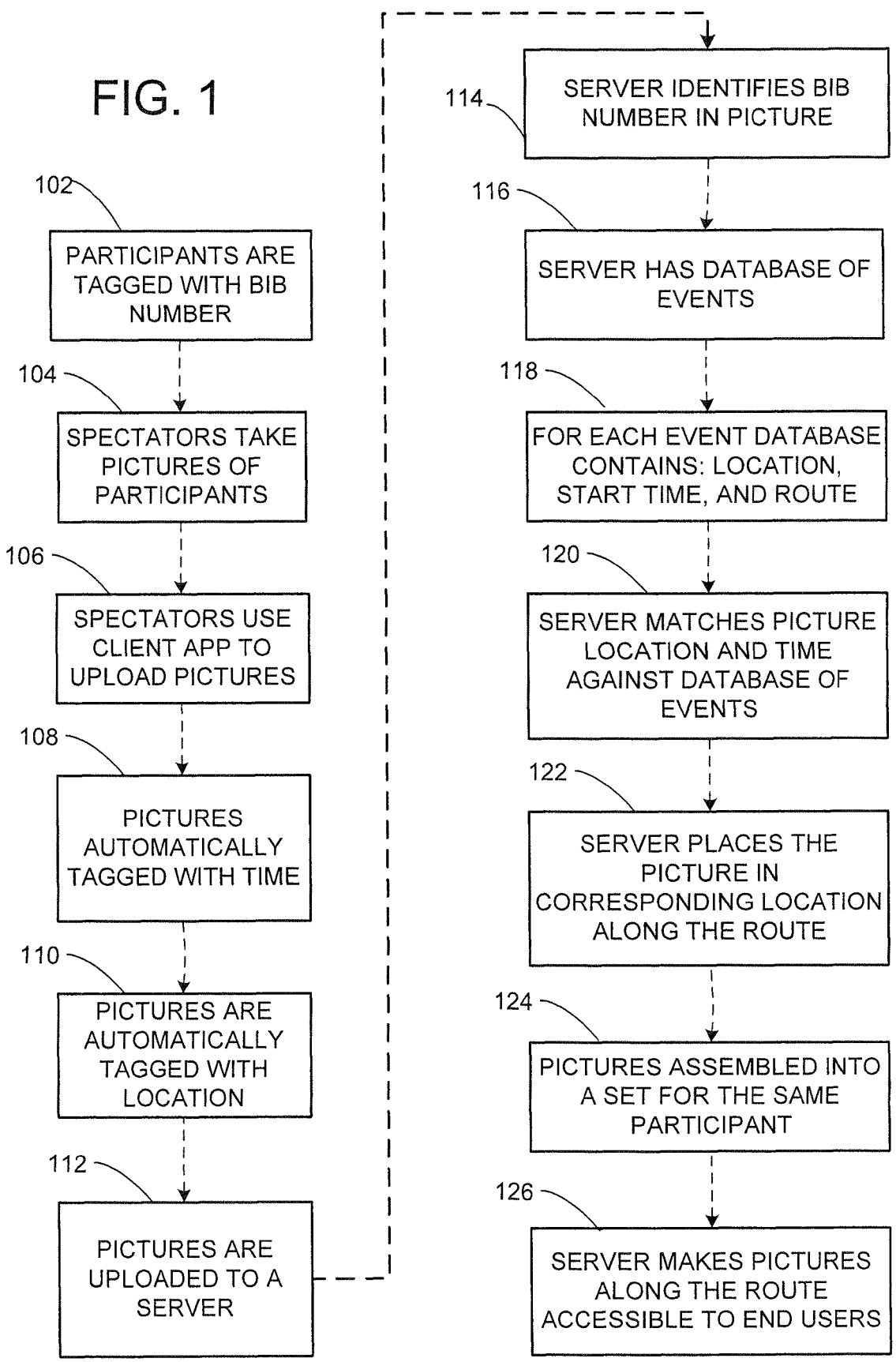
FIG. 1 is a simplified flow diagram illustrating aspects of one embodiment of a process in accordance with the present invention.

Returning to the cross-country race example, we assume a throng of runners, each having a bib number as discussed. Preferably, the bib number or symbol should be machine-readable. That is, an image of the bib number, e.g. captured with a camera, should be usable in an OCR (optical character recognition) system or the like. In an alternative embodiment, the bib may include an invisible indicator of the bib number, for example an RFID tag embedded in the bib. In that case, a suitable sensor or transceiver can capture the bib number from the RFID tag while the runner passes by the sensor.

Machine recognition of visible bib numbers may be used to advantage as follows. In some cases, a digital image (photograph) may be processed preliminarily to recognize a person; that is, distinguish a person in the image from the background. Person recognition is known in other applications, such as premises security systems that employ real-time video surveillance. In this regard, a video clip, rather than a still image, may be advantageous. Video coding techniques are known that separate moving or changing regions of an image from static ones. These techniques may be applied to more easily machine-recognize a person region in a digital image or video.

In other cases, separate recognition of a person may be unnecessary, and the process goes directly to locating the bib. Common bib locations are the chest, center of back, or low back of a runner or cyclist. Most bib number placards are rectangular. Based on size, shape and location, a computer-implemented process can identify likely candidates for the bib placard region. Multiple candidate regions may be captured, and stored for further processing, as discussed later. In one alternative embodiment, a special marking or symbol can be printed on the bib to make machine-recognition of the bib easier and more reliable.

In an embodiment, a character or symbol recognition process is applied to the candidate bib region of the digital image in an effort to recognize the bib number. In an embodiment, a machine learning method may be used to train a system for recognizing bib numbers. Character recognition techniques (OCR) are known in other applications such as processing images that contain text. OCR is also well developed, for example, in mail sorting machines such as those used by the US Postal Service to "read" addresses on paper mail pieces. To support this effort, in an embodiment, the character recognition processing machine (or software) may be coupled to a database that stores information on each of the participants, keyed by bib number. In this way, all valid bib numbers are known to the recognition system. This data can be used to resolve ambiguous characters in the recognition process. By knowing all valid combinations of characters from the database, a most likely solution of the actual characters in an image can be determined quickly. Using any or all of these techniques, the system automatically associates a bib number/name to a user.

In the case of a video clip, additional images (immediately adjacent to the one in question) can be processed to further assist in disambiguating the bib number. In the example of RFID or other such electronic "tag," the identifier is acquired at the same time as the photograph, and the two are associated together in a suitable Datastore. Even in that case, the electronic identifier may be corrupted or incomplete. It too may be recoverable by processing available information in conjunction with the participant database.

In another alternative, facial or object recognition software may be included to recognize a person when the bib number is occluded or otherwise not recognized. One technique is to match a picture with another picture in which the same person appears with a readable bib number. Other embodiments may include the following:

1) Having just a bib number in a database a priori, capturing a face image from an image in which the bib number is recognized, and then using that captured face image to recognize images that contain either the face, the bib number, or both (i.e. in particular recognize images that contain the face regardless of whether the bib number may or may not be unrecognizable.)

2) Having a face image and a bib number in a database a priori, and using either (or both) to recognize images that contain either the face, the bib number, or both.

3) Having just a face image in a database a priori, and then using that to recognize images that include the face image and extracting bib numbers from the image that might then be used to recognize images that contain either the face, the bib number, or both.

Technology for recognizing faces in still images including video frames is now common and can be used as a building block for identifying people in an image from an event as an alternative to bib number recognition. Because bib number recognition is conceptually simpler than face recognition, bib recognition strategies for identifying race participants in a still image might be described and claimed a lower level of algorithmic abstraction than facial recognition strategies. Normative bib recognition strategies would seek to identify digits and group them into bib numbers without reference to any data circumscribing the set of potential bib numbers. Comparative bib recognition strategies, in contrast, would incorporate the set of potential bib numbers in an event into the recognition algorithm to improve the recognition accuracy.

Due to the computational burden and the conceptual challenge of defining a set of facial attributes that can be easily associated with a user without reference to example images as a bib number can, such as when a user registers to participate in an event, facial recognition strategies would typically be comparative. That is, a target image including one or more individuals would be compared to one or more reference images of single individuals who might be in the target image. Images of an individual participant's face may be located by searching the web to locate media items tagged with the participant's name, and downloading them. This comparison could be direct, in the sense that the reference images are matched against the target image. The comparison could also be indirect in the sense that a set of reference and potential facial attributes are extracted from the reference and target images, respectively, and the reference facial attributes then compared to the potential facial attributes for possible matches.

Regardless of the comparison model, there are also a couple of possible recognition strategies. One strategy assumes that one or more known reference images are available for each individual that may potentially appear in a target image. Each reference image is compared to the target image to arrive at an estimated confidence value that the person in the reference image appears in the target image.

Another strategy assumes that a name or an equivalent identifier is known for each individual that may potentially appear in a target image and that a library of reference images labeled by name or an equivalent identifier. In this strategy the identifier for each individual that may potentially appear in a target image is used to retrieve images from the reference image library for those individuals. Those reference images are then used as in the first strategy to compute an estimated confidence value that the person in each reference image appears in the target image.

Data Sources

For a given event such as a footrace, event data, route data and runner data are prepared and stored in digital form for processing as further described below. The data can be organized, keyed, sorted, and or related in various ways, but the following simple data structures are illustrative. Additional databases are described later with regard to FIG. 5. Details of data storage systems and memory are known so details are omitted herein. In Table 1, an event database or table is illustrated by way of example and not limitation. The fields are self-explanatory. Various searching, matching or fuzzy logic techniques can be used in later processing for accessing this database to identify an event, for example from a bib number recognized in a submitted photograph. The "Participants" field preferably is not literally a list of the participants in the event, but rather a link to a Participants database, discussed below. In a presently preferred embodiment of a system in accordance with the present invention, the event database is accessible to a central server system, of the type known for hosting an Internet web site.

TABLE 1

Sample Event Database.

| Event Name | Start date/time | Sponsor | Start Location | Route | Participants | Results |
| --- | --- | --- | --- | --- | --- | --- |

A participant database, also accessible to a central server, may include the illustrative data shown in Table 2 below. Users or participants need not be registered in the database prior to the event. In a preferred embodiment, participants can be added at any time—before, during or after a race. Names and bib numbers are automatically associated with the corresponding participant whenever that person's data is entered in the database. So, for example, a user might access the system after a race, introduce an event and bib number, and the system can conduct a search or database query, and retrieve all of the pictures associated to the new bib number (or links to them). A sample race registration database follows in Table 3. Again, these various tables may be linked, indexed and or associated in various ways.

TABLE 2

Sample Participant Database.

| Chip code or RID | Bib | FirstName | LastName | DOB | Gender | Email | Event |
| --- | --- | --- | --- | --- | --- | --- | --- |

TABLE 3

Sample Race Registration Database.

| Name | Email | Address | CSZ | DOB | Age | Emergency Contacts | Reg Date | Event | RID |
| --- | --- | --- | --- | --- | --- | --- | --- | --- | --- |

Additional information may be provided by a participant during registration, or subsequently acquired and stored in association with a corresponding participant subsequently. For example, a registrant may provide (upload) an image of herself during a registration process, for various uses including facial recognition/matching with other media items acquired from other sources.

Routes can be defined in various ways. For example, a race organizer may publish a conventional map, marked up or annotated to show a race route. Such a map may be stored and distributed, for example as a simple pdf file. Details of the route, in machine-readable form, may be embedded in layers of the pdf file. Routes may also be defined by a stored data structure or list, for example, as a series of locations or "waypoints" arranged in the sequence of the race route. Waypoints can be defined as landmarks ("the water fountain at 3d and Iditarod Streets"), or geo-locations such as LAT, LON, and ALT. This data can be acquired easily with even consumer grade GPS equipment, or publicly available databases. Data should be stored in a route database in machine-usable form. For example, a process should be able to find the closest point along a given event route, given an input location. In one embodiment, the input location is provided in association with a photo taken along the route. The location of the photo (i.e., the geographic location of the scene in the photo content) may be provided manually by input by the photographer, or automatically as follows.

In some arrangements, the Photos field, for example, may include pointers or UIDs or URL or URI to individual photos, or simply a link to a directory, linked list, etc. Various ways to store and access such data are known to those skilled in computer and Internet technologies. See Table 4 below.

TABLE 4

Sample Photo Database.

| RID (registrant ID) | Photos |
|---|---|

Illustrative Procedures

Capture. In operation, a computer-implemented process carried out in or coupled to a server, receives content, for example still photos or video clips, from "input sources". The input sources may be capture devices located along the route of an event. They may be automated, remotely controlled, or operated by an observer along the route. These remote devices include a digital camera or the like for capturing/creating photos or video clips showing participants "in action" during the event. The devices may be pre-positioned or installed at selected locations along the route. Those at fixed locations may be arranged to take photos at predetermined times or intervals. Preferably, however, the input devices are portable electronic devices, such as a PDA, Blackberry, iPhone, gPhone or the like. The operator(s) of the portable devices along the route ("Spectators") may be friends and family of event participants, amateur photographers, or any interested individuals.

The remote devices may comprise any device capable of creating a digital image, such as a photo or video clip, and transmitting a file containing the image content, such as a jpeg, mpeg or other file format, to the server. Preferably, the picture file is transmitted over a wireless network, to enable the picture taker to be mobile. For example, the wireless network may be a 3G wireless telecommunications network. The picture capture and wireless transmission functions may be integrated into a single multi-function device, or they may be separate devices coupled together, for example by cable or a short-range wireless link (Bluetooth). Photos or other media (video clips, audio recordings) can be uploaded to the server at any time during or after the race.

In addition, the server may be arranged to "crawl" other photo sites such as Flickr to retrieve additional photos, associated with the event or with an individual participant. More detail is given below. Other sources are described below with regard to FIG. 5.

In a preferred embodiment, a remote device such as a smart phone executes a small application program to implement the functionality described herein. After an image is captured, the application manages uploading the image to the server. The application first tags each image with a date/time stamp. The application also tags each image with location data, for example acquired via a GPS receiver, which may be integrated into or coupled to the portable device. Alternatively, a user may enter location information manually for tagging a photo. Accordingly, during an event, the server is receiving image content from a plurality of spectators along the event route in near-real time. In another aspect, a user may upload media items at his convenience, for example from a home computer, after the event. This may include, for example, posting content to Facebook, to a Flick account, via RSS feed, etc.

Website API Models

Many web 2.0 websites like Flickr®, Facebook®, Twitter®, and LinkedIn® provide "application programming interfaces" (APIs) that allow another website or webservice to access user data. Some embodiments of the present invention make employ such APIs to find and import media items as described herein. There are at least two ways for a second website to access to user data on a first website via an API such as this. In the first method, the user provides the user's access credentials to the second website, and that second website then retrieves data from the first website by providing the user's credentials to the first website.

In the second method, the user typically indicates to the second website he or she has data on the first website, the second website then redirects the user client (frequently a browser) to an authentication means on first website. The user then provides the credentials directly to the first website. The first website authenticates the user and redirects the user's browser back to the second website along with a new credential. The second website then uses the new credential to access the user's data on the first website. FaceBook Connect is a proprietary solution that works in this manner to provide a second website access to a FaceBook user's identity, social graph, and stream information. LinkedIn uses the OAuth, an open source version of this authentication model, to provide a second website access to a LinkedIn user's data.

Digital Media Item Sharing Service Search Models

A digital media item sharing service/website such as Flickr invariably provides multiple means for a user to find media items of interest contributed by all users. There are at least two ways that are quite common. The first is to allow contributing users to create an account dedicated to a specific topic, event, or user. In this case, the search means simply provides a way for a consuming user to specify identifying information for that dedicated account and then provides the user with access to the content associated with the account.

The second is to allow the contributing and/or consuming users to tag media items with labels that describe or identify the items. Such tagging may be done regardless of how items are categorized into accounts. For this case, the search means allow the user to specify tags and then provides the user with access to digital media items labeled with that tag. As noted, digital media item sharing websites typically also provide APIs that a second website can use to access contributed digital media items using either of these search models.

Various features and aspects of the invention may be implemented in a host computer, server, virtual server, cluster, etc. Details of such hardware and related software are known elsewhere. For simplicity, we refer herein to a server implementation, although that term is used broadly, and is not limited to a single host; nor is any limitation on its location implied.

Processing Imported Media Items. At the server, various processes may be carried out. They may be done roughly in the order shown below, although in some embodiments, certain processes may be executed concurrently. In some embodiments, some steps may be omitted. For larger systems or large events, distributed processing, clusters or other forms or parallel processing may be advantageous.

FIG. 1 illustrates one embodiment as follows. At block 102, participants have been tagged with bib numbers as discussed above, prior to starting the event. As noted, individuals' data may be entered before, during, or after an event. During the event, such as a footrace, spectators may take (digital) pictures of participants along the route, block 104.

As mentioned, in one embodiment, spectators employ a portable device that includes a digital image capture capability, as well as the ability to execute a small application program. At block 106, the spectator uses the application to upload the picture(s). Preferably, a wireless connection may be used to upload the pictures, for example using the wireless telecom network. Alternatively, short-range wireless connections may be used, such as Bluetooth® transceivers, to upload the pictures via an intermediary facility provided along the route. The application program may tag each picture or batch of pictures with location and time.

In an embodiment, the pictures are tagged automatically with a timestamp in the server, block 108. Pictures may include a timestamp applied by the capture device, but they may not be accurate. Pictures also may be tagged with a location. For example, in an embodiment, the capture device may include a GPS receiver, and the application may include location data acquired from the GPS in the picture upload. In an alternative, a marker with a number or other symbol may be placed along the route and the picture taken at such a location so that the symbol appears in the picture, available for machine recognition and lookup to determine the location at which the picture was taken. The pictures are uploaded to a server, block 112. Further with regard to FIG. 1, the server identifies the bib number in the picture, using various means including but not limited to those described above, or equivalents thereof, block 114. For images where bib number recognition proves difficult, those images may be off-loaded to an alternative process which may be more capable of recognition but at a higher computational cost.

As noted earlier, the server has access to a database of events, block 116. For example, in one embodiment, the database includes, for each event, the corresponding location, start time, and route; illustrated at block 118 and the table above. Then the server, at block 120, matches the picture location and time against the database of events. This may not be a separate step. In some embodiments, the event may be determined by the bib number. In an alternative embodiment, the event may be identified explicitly by the spectator or in picture metadata provided by the portable application.

Figure 3:
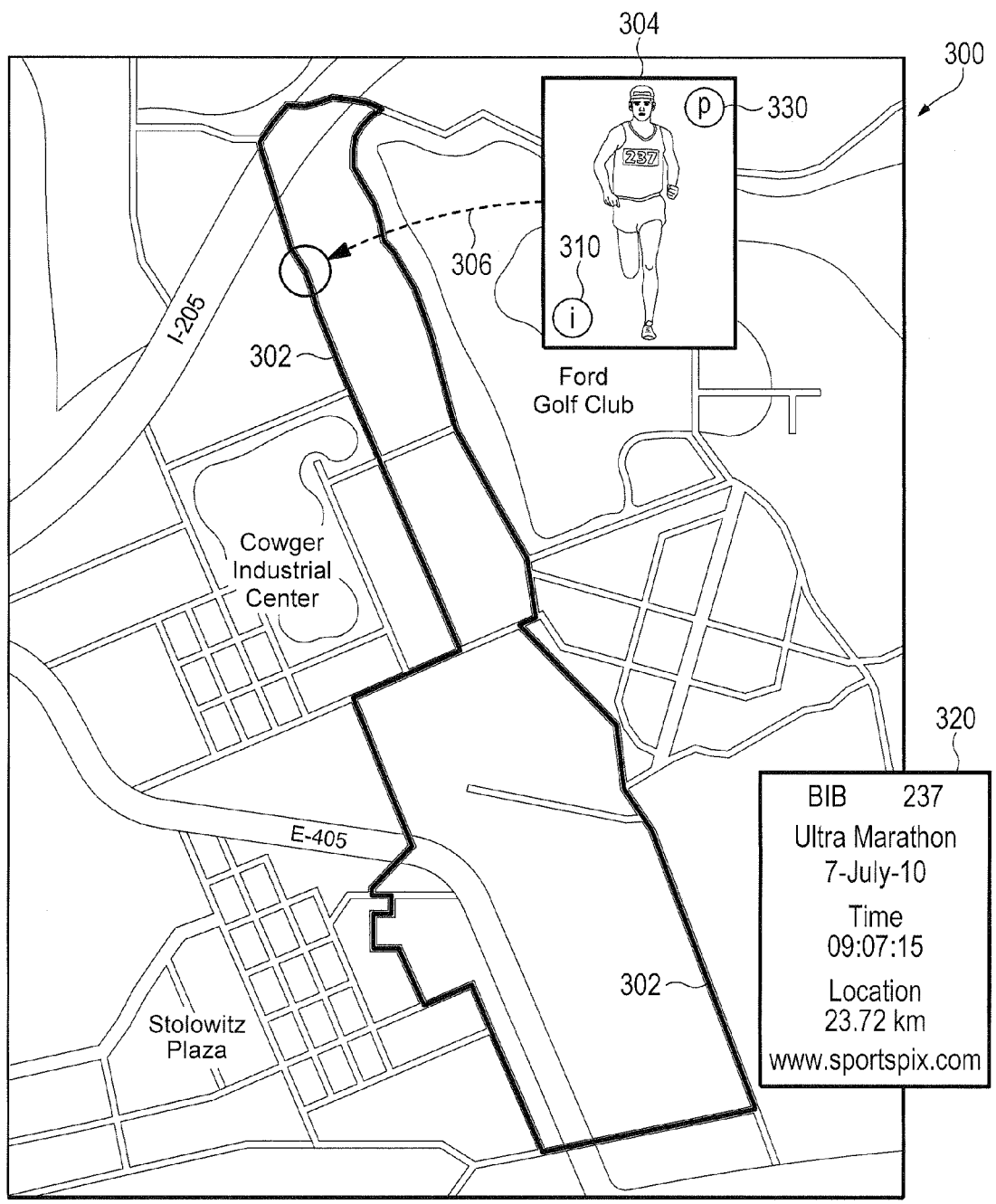
FIG. 3 illustrates a route map sample output content in accordance with an embodiment of the present invention.

At block 122, the server software then places the picture at the corresponding location along the route. The photos can be located along the route by using spectators' and system devices that have GPS capability. Alternatively, a location along a route may be described by a street intersection, landmark name or other keyword(s), or mile (km) marker on the route. An example is illustrated in FIG. 3. In FIG. 3, a map display 300 indicates the event route 302 (by color, boldface, etc.) A photo, shown in thumbnail 304, is graphically associated to a location on the route by dashed line 306. The picture may be sized as appropriate for display on the route map. Additional information may be displayed by clicking an indicator ("i") at 310. For example, a click at 310 may present another panel 320 to display various information associated with the photo. Or just "mousing over" the photo may invoke the supplemental panel. The panel preferably includes the user bib number, event, time and location data associated with the photo. The participant may select whether or not to publish her name on a public site. In an embodiment, an option to purchase a photo may be invoked, for example by clicking a purchase button ("P") 330. Terms of purchase are discussed later. This is just one example of various output content, further described below.

Referring again to FIG. 1, in an embodiment, the server may assemble multiple pictures of the same participant into a set; block 124. The digital images need not be physically or literally assembled in memory, but merely associated in the database, for example using tags pointers, links or lists, or other software techniques. As discussed below, these images (or video) may be aggregated from a variety of external sources such a social networking sites. This has the advantage of bringing a more egalitarian perspective, as distinguished from traditional, professional sports reporting or network news casting. See sample image lookup table below. These sets of pictures, alone or with other content, may be published or distributed so that they are available to interested users, for example via the Internet. They may also be displayed, for example in the form of a slideshow, on one or more video display screens. The video displays may be located at remote locations, and or at the event forum, finish line, etc. Preferably, a very large display is visible to a large audience. Audio may be provided as well—collected in a manner similar to that described below for aggregating visual (photo and video) media items.

Figure 2:
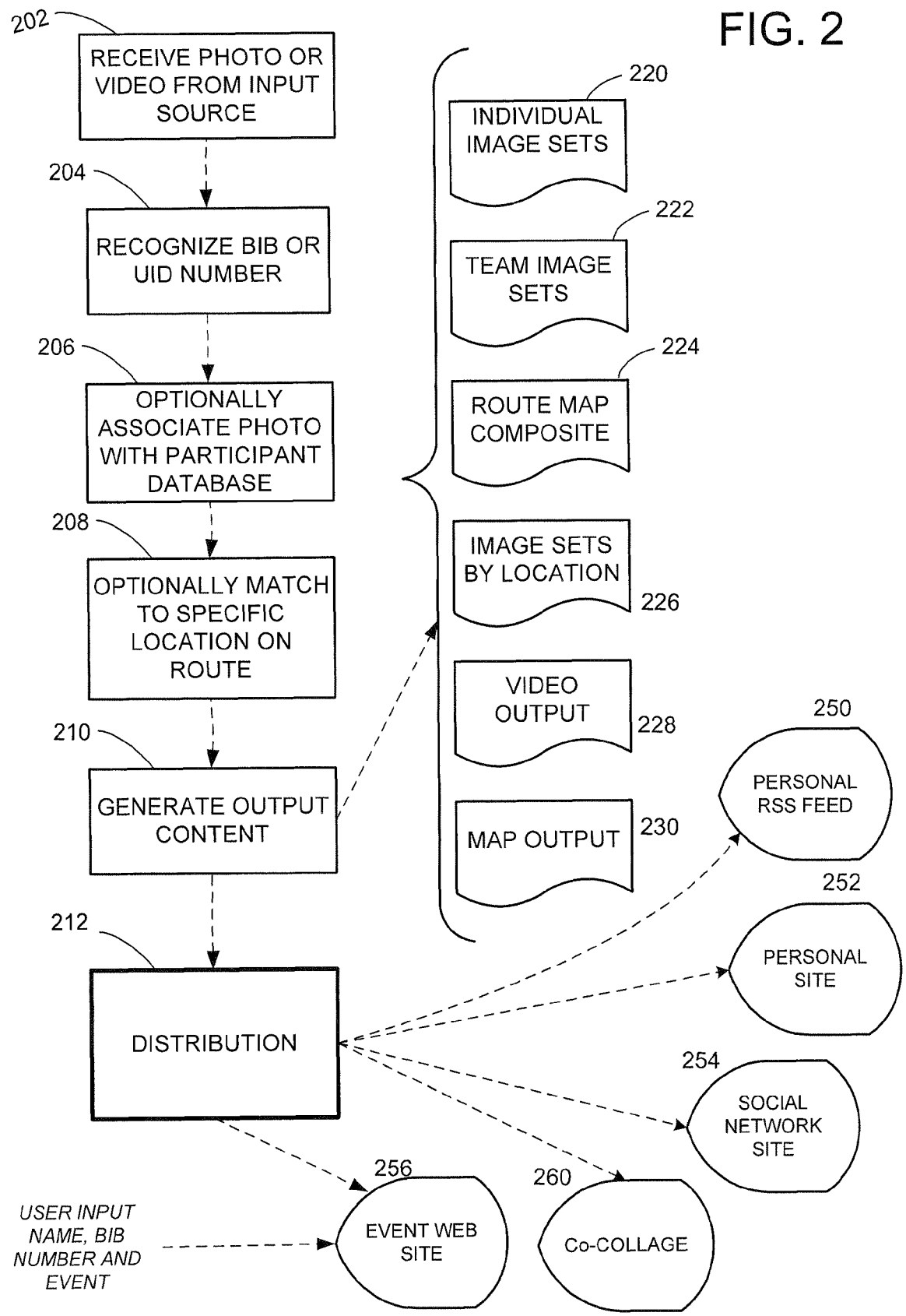
FIG. 2 is a simplified flow diagram illustrating aspects of another embodiment of a process in accordance with the present invention.

FIG. 2 illustrates aspects of other embodiments, as follows. A photo, video or other digital content is received from an input source, at block 202. Various sources are described above. The system or process recognizes a bib or other UID number, block 204, or recognizes a participant's face as explained above. Then the photo or other content is associated with a participant in a database based on that identification, block 206. Optionally, the content may be matched to a specific location on the event route, as described above, block 208. The server may generate output content, block 210, based on the received input content, participant database content, and optionally other sources.

Content Creation and Output Channels

The specific location data of each image may be associated to a chart, map or digital image of the course. See FIG. 3. In one embodiment, each image of a selected participant is associated to a specific location along the course. Other output content can be created and published as explained below. For example, referring again to FIG. 2, output content may include individual images sets 220—comprising all images of a selected participant, or a selected group of participants, or images of all participants at a given location along the event route. Other output content may comprise team image sets 222, route map composites 224, for example as in FIG. 3, image sets by location 226, video output 228, and other versions of map outputs 230. Video content can be selected and organized in much the same manner as still photos.

Figure 4:
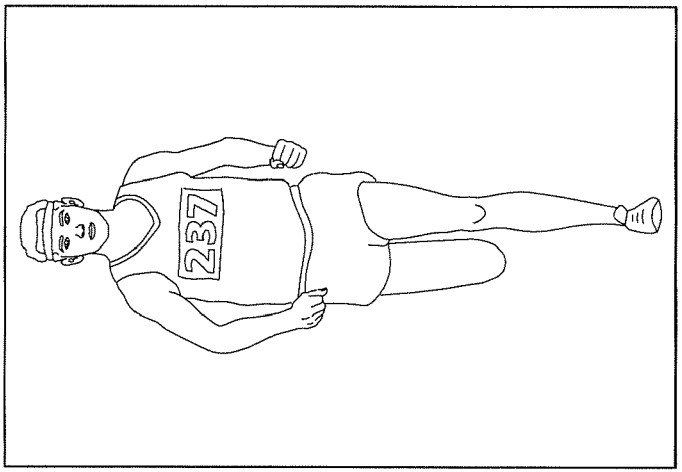
FIG. 4 illustrates a web page sample output content in accordance with an embodiment of the present invention.

Any or all such output content can be published at an event web site 256, or via each user's personal space at a social networking site 254, and or via the user's personal feed 250 or personal site 252, or to a community electronic display screen 260. Access to various external sites may be effected by use of various API's, or by using a participant's login credentials provided at registration. FIG. 4 is a simplified illustration of a personal web site of a runner, to which generated output content of a running event has been published.

TABLE 4

Sample Image Set Table
Columbus Marathon
Barcelona, Spain
Jul. 22, 2008
Start 10:00 25 km run
Participant: Francesca Gomez Martinelli

| TIME | LOCATION (LON, LAT, ALT) | | | SHOW ON MAP | IMAGE |
|---|---|---|---|---|---|
| 10:00 | 2.20 | 41.40 | 95 | <link> [See drawing] | link <020.jpg> |
| 10:04 | 2.21 | 41.39 | 100 | <link> | link <334.jpg> |
| 10:18 | 2.21 | 41.38 | 150 | <link> | link <8589.jpg> |
| 10:55 | 2.20 | 41.41 | 110 | <link> | link <m8589.mpg> |
| 11:08 | 2.19 | 41.55 | 72 | <link> | link <244.jpg> |

In another aspect, images are accessed through in interactive graphic or map of the event route (see drawing), rather than a textual presentation. In other aspects, the system can sort images by timestamp to form a timeline. The timeline can show images of one or more selected participants. The corresponding images can be published as an attractive "slide-show". In another embodiment, the disclosed system can associate the timeline with course, distances, mileposts, landmarks. Such information also can be used to search for or browse images. In another embodiment, the pictures could be published in a feed produced by the photographer, or by all the photographers collectively on the site, for consumption by others, too. The foregoing examples are merely illustrative of the inventive concepts and are not intended to be limiting of its scope. Other details and variations will become apparent to those skilled in the art in view of this disclosure.

Bookmarking and social networking sites, such as Reddit, Facebook, Stumbleupon, Blinklist, Manolia, Digg, Delicious, Newsvine, Furl and Strands are known. At these web sites, users can share content with others (e.g. authorized "friends"), comment on other postings, etc. Internet "Feeds" such as RSS are becoming common as well. RSS (Rich Site Summary) (or Really Simple Syndication) is a format for delivering regularly changing web content. Many news-related sites, weblogs and other online publishers syndicate their content as an RSS Feed to whoever wants it. RSS feeds thus provide a relatively spam-free, quick and efficient way to read news and weblogs. The present invention in a preferred embodiment integrates into a user's outbound feed for sharing personal sporting event content in a compelling and timely manner. Such content may include, but is not limited to, data, text, graphics, images (still or video), links, etc.

In one embodiment, the present service/server creates an RSS feed of items, each of which includes a URL for the pictures stored on the server, and the runner's Strands.com (or other site) system is directed to monitor that RSS feed. In this case, in effect the URLs (RSS feed items) for all pictures would be going to each user's account that is monitoring the feed. In another embodiment, the server might create an RSS feed for each runner, and the runner's Strands.com or other social networking account would just monitor the RSS feed for that runner. The server then would put the picture in the right feed for the runner and the runner's Strands.com account would then only be receiving URLs (RSS feed items) for pictures for that runner. Of course, for the pictures to actually be displayed to the runner in this model, the Strands.com system would have to look at the URLs in the feed items and request the pictures from the server for display to the runner.

In another embodiment, for example to interface with a FaceBook or similar account, the server may use one of the FaceBook APIs, and would employ the user's FaceBook credentials to publish the pictures to the user's FaceBook account. These postings are not necessarily limited to only pictures. For example, a URL may be provided that links to a map or graphic of the event course, as mentioned above. That map, in turn, may include images, or it may be interactive in the sense of presenting links to individual images, preferably associated with specific locations along the course as discussed above.

Conversely, feeds from an external site, e.g. Flickr, may be used to import content to the present system. In general, the aforementioned and other Web 2.0 technologies can interface with elements of the present invention to enable and enhance interaction among athletes and the broader community. This aggregation feature is illustrated in FIG. 5.

Figure 5:
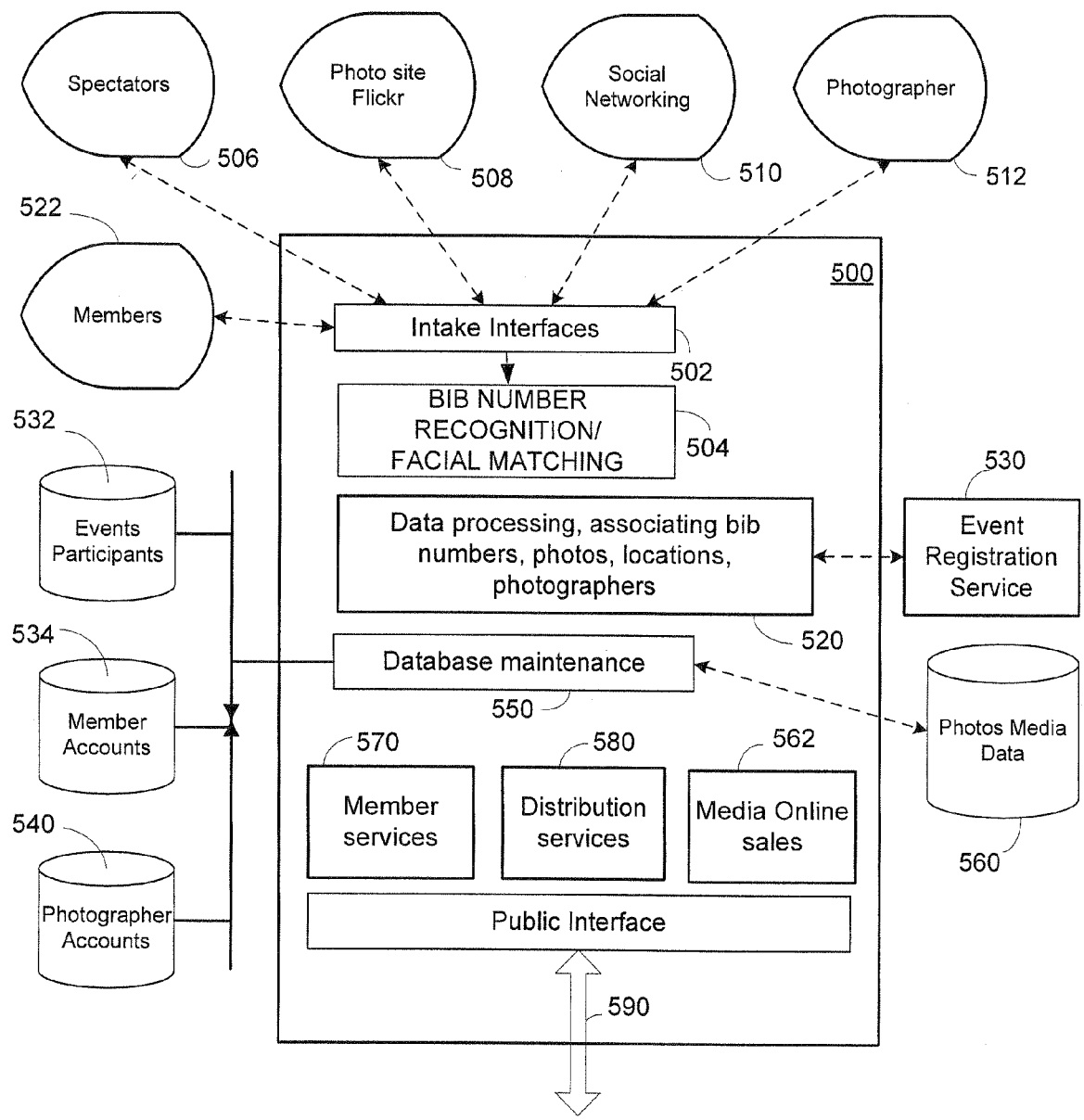
FIG. 5 is a simplified functional diagram of a web-based system in accordance with an embodiment of the present invention.

FIG. 5 is a simplified functional diagram of a web-based system in accordance with an embodiment of the present invention. A server 500 may be configured to provide the following functionality. For example, this may be a web server or it may be coupled to a web server. A variety of intake interfaces 502 are provided for interfacing with various external sources. For example, spectators 506 who attend a given event may elect to upload photos or other media items to the server 500 via an appropriate interface 502. As another source, a photo website such as Flickr 508 may be used as another source of media items associated with a given event. The server 500 can be configured to "crawl" Flickr or other social networking websites 510 to identify and upload such content. In addition, professional photographers 512 may choose to upload their photos, again through an appropriate intake interface 502, for online sales described below. In the case of social networking site Facebook, members can "push" media, called sharing, to make it available to non-members. In this regard, such photos can be imported to the server 500 without the use of Facebook member credentials. In short, the web server includes software components for aggregating content from various external sources, by push and or pull methods.

In another embodiment, a user account may be established at Flickr or another media item sharing site for a specific event. Media items associated with that event can then be uploaded from various sources, for example participants or spectators, to the corresponding site, again using Flickr as an example without limitation. The server system 500 can be configured to download media items from that site. Since the site is event-specific, correlation to the event is inherent. API access is described above.

Referring again to FIG. 5, members 522 also can interact with the server 500 with the use of an appropriate interface. The term "members" is used here to mean users who are registered with the website 500, and therefore have corresponding log in credentials. Members may also be participants in a given event. In the server 500, the various media items imported through interfaces 502 are processed in a bib number/facial image matching process 504, described in more detail above. Next, various data processes take place, block 520, including associating bib numbers with corresponding photos (other media items), locations along a route, photographers, etc. In this regard, the server 500 may include or have access to an event registration service 530. Event registration data bases are discussed above.

The data processing module, block 520 is enabled in part through access to various data bases. This is accomplished through a data base maintenance, block 550, which may include various known database maintenance and or query techniques and services. The server 500 has access through appropriate interfaces to an events and participants data base 532, aspects of which were discussed above. It also has access to a data base 534, member accounts, which may include various personal data, preferences, history, etc.

Another data base 540 stores photographer accounts. In this regard, photographers 512 may establish an account in order to upload their photos, associated with a corresponding event(s) for distribution through the server 500. In this regard, the server may include a media online sales service 562 which enables users (through the public interface 590) to search for photos or other media, view thumbnail images, etc. Users may then elect to purchase media items for download, from the media item data store 560, through the online sales service 562. The sales service implements terms of sales that are determined in the photographers account settings in database 540, for example pricing, format conversion, resolution, delivery options. There may also be provision for copyright licensing, granted by the photographer, through the web server. These features may relieve photographers from the burden of building their own sites for direct content sales. The present site may be expected to attract a wide audience, well beyond the actual event participants, with the corresponding potential for more sales than a photographer might achieve marketing directly to the participants alone. That said, in another embodiment, the server may provide a link to the photographer's site, as illustrated in the panel 320 of the map display of FIG. 3. Users may follow the link and purchase the corresponding photograph. A commission may be returned to the site 500 proprietor in consideration of the referral. Returning to FIG. 5, Member services, block 570, provides typical services for members 522, such as registration and maintenance of user accounts.

A key aspect of the server 500 is the distribution services 580, which may be implemented using any appropriate website software technology. The distribution services provides an interface for interested persons, especially participants, to explore the media items and information regarding events of interest that have been aggregated by the server system 500 from a variety of external sources such as those mentioned above. Users of the website can conveniently search for events of interest, or participants of interest. They may explore the route, for example using an interactive map such as that illustrated in FIG. 3, to identify locations of interest and corresponding photographs or other media items. Users may also explore race recap and results information. Other aspects of the distribution services 580 were discussed above with regard to FIG. 2. In another aspect, the community generated content described above can be assembled, sorted, filtered and distributed into any existing Web 2.0 application.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented digital media clearinghouse system for an athletic event comprising:
   (a) a communications component to implement communications with the system via a wired or wireless network, the communications component arranged to support the media item import interface and the distribution service;
   (b) media item import interfaces, including a spectator interface and a web site interface, for importing digital media items and data associated with the athletic event;
   (c) the spectator interface arranged to receive digital media items uploaded by a user;
   (d) the web site interface arranged to receive digital media items imported from a remote web site;
   (e) a database access component for accessing an event database, the event database storing registration data for each registered participant in the event, wherein the registration data for each participant includes personal identifying data and a bib number that is unique for the event;
   (f) an image processing module coupled to the import interfaces to receive the digital media items and to store the received digital media items and associated metadata in a media item database;
   (g) the image processing module including or coupled to a machine-recognition component to recognize a bib number worn by a registrant who appears in acquired received media item, and if a bib number is not recognizable, to identify a human face that appears in the received media item, and to associate the processed media item with the corresponding registrant; and
   (h) a distribution service for generating and distributing digital output content, wherein the distribution service aggregates together media items from all sources that have been recognized as associated with a specific registrant;
   (i) wherein said identifying a human face includes acquiring at least one digital image of the face of at least one registered participant for comparison, and
   the image processing module is arranged for accessing at least one remote web site, searching the remote web site to identify images tagged with the name of the registrant, downloading the identified image files, and associating the downloaded image files with the corresponding registrant.

2. The system according to claim 1 and wherein:
   the remote web site provides an application programming interface (API) to enable another system to access user data; and
   the web site interface interacts with the API to identify and download the digital image of the face of the registered participant.

3. The system according to claim 1 and wherein the remote web site implements a digital media item sharing service.

4. The system according to claim 3 and wherein the sharing service has an account associated with the event, and the web site interface is arranged to import digital media items associated with the event that were posted to the sharing service event account.

5. The system according to claim 1 and wherein:
   the registration data of a registrant includes the registrant's personal login credentials for a remote web site where the registrant is a user; and
   the web site intake interface applies the registrant's login credentials to access the remote web site, identify media items associated with the event, and to download the identified media items associated with the event from the remote web site.

6. The system according to claim 5 and wherein the remote web site implements a social networking service of which the registrant is a member, and the digital media items are associated with the event by a label or tag.

7. The system according to claim 5 and wherein the remote web site or a web page on the remote web site is itself associated with the event.

8. The system according to claim 5 and wherein the remote web site or a web page on the remote web site is itself associated with the registered participant.

* * * * *